US011896458B1

(12) United States Patent
Dahiya

(10) Patent No.: US 11,896,458 B1
(45) Date of Patent: Feb. 13, 2024

(54) DENTAL IMPLANT ABUMTMENT SYSTEM AND METHOD OF USE

(71) Applicant: Ankur Dahiya, Houston, TX (US)

(72) Inventor: Ankur Dahiya, Houston, TX (US)

( * ) Notice: Subject to any disclaimer, the term of this patent is extended or adjusted under 35 U.S.C. 154(b) by 312 days.

(21) Appl. No.: 17/102,964

(22) Filed: Nov. 24, 2020

Related U.S. Application Data

(63) Continuation of application No. 16/785,508, filed on Feb. 7, 2020, now Pat. No. 10,874,488.

(51) Int. Cl.
*A61C 8/00* (2006.01)

(52) U.S. Cl.
CPC .......... *A61C 8/0056* (2013.01); *A61C 8/0062* (2013.01); *A61C 8/0063* (2013.01); *A61C 8/0069* (2013.01)

(58) Field of Classification Search
CPC ... A61C 8/0056; A61C 8/0062; A61C 8/0063; A61C 8/0069
See application file for complete search history.

(56) References Cited

U.S. PATENT DOCUMENTS

| | | | | |
|---|---|---|---|---|
| 2010/0055645 | A1* | 3/2010 | Mullaly | A61C 8/0075 433/215 |
| 2012/0202173 | A1* | 8/2012 | Seo | A61C 5/70 433/220 |
| 2013/0209958 | A1* | 8/2013 | Benz | A61C 8/0068 433/173 |
| 2016/0287360 | A1* | 10/2016 | Fisker | A61C 8/0077 |

* cited by examiner

*Primary Examiner* — Cris L. Rodriguez
*Assistant Examiner* — Drew S Folgmann
(74) *Attorney, Agent, or Firm* — Richard Eldredge; Eldredge Law Firm

(57) ABSTRACT

A dental anchoring system includes an angled abutment, having a main body extending from a top to a channel body, the channel body extending away from the main body at a predetermined angle less than 180 degrees; a lip extending around the top; and an opening extending from the top and through the channel body, the opening to receive an attachment device; the angled abutment is to provide an angled attachment for a dental prosthetic.

4 Claims, 15 Drawing Sheets

DENTAL IMPLANT ABUMTMENT SYSTEM AND METHOD OF USE

BACKGROUND

1. Field of the Invention

The present invention relates generally to dental attachment systems, such as for attaching dental prosthesis, such as overdentures, partial dentures, and the like to the implants placed in user's mouth, and more specifically, to an angled abutment that aids a dentist to design and make a better prosthesis and further allows for improved comfort associated with the securing of dental prosthesis for a user.

2. Description of Related Art

Dental implants are placed in a patient's jaw to replace missing teeth or as part of maxillofacial prosthesis to replace or aid in reconstruction of missing oral and/or facial structures. There are available various kinds of abutments for specific dental prosthesis but still these conventional abutments do not offer much versatility.

Locator abutment systems are well known in the art and are effective means to secure a dental prosthesis within the mouth of a user. For example, FIG. 1 depicts a conventional locator abutment 101, having a retaining device 105 configured to secure an abutment 103 to a dental implant, wherein the dental implant is placed in a patient's bone, a retentive insert 109, and a metal cap 107. In some embodiments, a hole 113 may extend into the abutment for extra retention and to engage a driver to tighten the abutment to an implant. As shown, these conventional systems utilize a straight abutment, which can be limiting in use, as a straight angle is not always suitable for proper fit and securement of the dental prosthesis on an implant within the user's mouth.

There are additional embodiments of conventional systems. Namely, abutments that are available for removable prosthesis which allow a snap on fit and retention, however, these systems may not offer the same level of support as do the abutments used for fixed prosthesis. Thus, the prosthesis needs support from residual ridge as well. Abutments used in fixed prosthesis do not allow patients to remove the prosthesis themselves, as the prosthesis can only be removed by a trained dentist in office. This creates the problem of hygiene maintenance around the fixed prosthesis which can jeopardize the long-term prognosis. The mandibular fixed dentures have been made with at least a 2 mm gap between the intaglio of prosthesis and residual ridge for hygiene maintenance. For maxillary fixed dentures, if the prosthesis to ridge junction is not above the smile line of patient then either a dentist has to make the prosthesis with a facial ridge lap or remove the maxillary residual ridge bone to a point where the junctions would be above the smile line. In the first scenario, the ridge overlap makes hygiene maintenance next to impossible while the latter is very aggressive approach. The abutment mentioned in this invention would allow avoidance of all of the above-mentioned issues.

Accordingly, although great strides have been made in the area of anchoring devices for dental implants, many shortcomings remain.

The system of the present invention includes an abutment that would be screw retained on an implant. The abutment can also be made as the supragingival extension of a single stage implant, a plastic burn out pattern for bars, titanium or other metal to solder on a bar, to be attached to the distal of an abutment tooth, or be cemented into the residual root of a natural tooth, on a multi-unit abutment, etc. The design of proposed abutment would allow for the prosthesis to be retrievable by the patient or dentist using proper tools or by hand. It would further offer different retention levels and can be used for removable partial dentures, complete dentures, hybrid dentures, fixed dentures, other prosthesis or any maxillofacial indication.

While providing the benefit of retrievability the new abutment should also provide good resistance and support to any kind of prosthesis. For crowns and fixed partial dentures (FPD) the biggest advantage would be no cement or screw access hole. Crowns and FPD's would be locked into place using the retentive inserts.

The abutment can be made to have an engaging connection with the implant in which case it may be retained by a separate screw. The other design can be of a non engaging connection to the implant where the abutment may have screw threads build into it that would allow it to be screwed onto a dental implant. The design of the connection and screw or screw threads would be different and correspond to each implant system as different implant companies have their unique implant designs.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
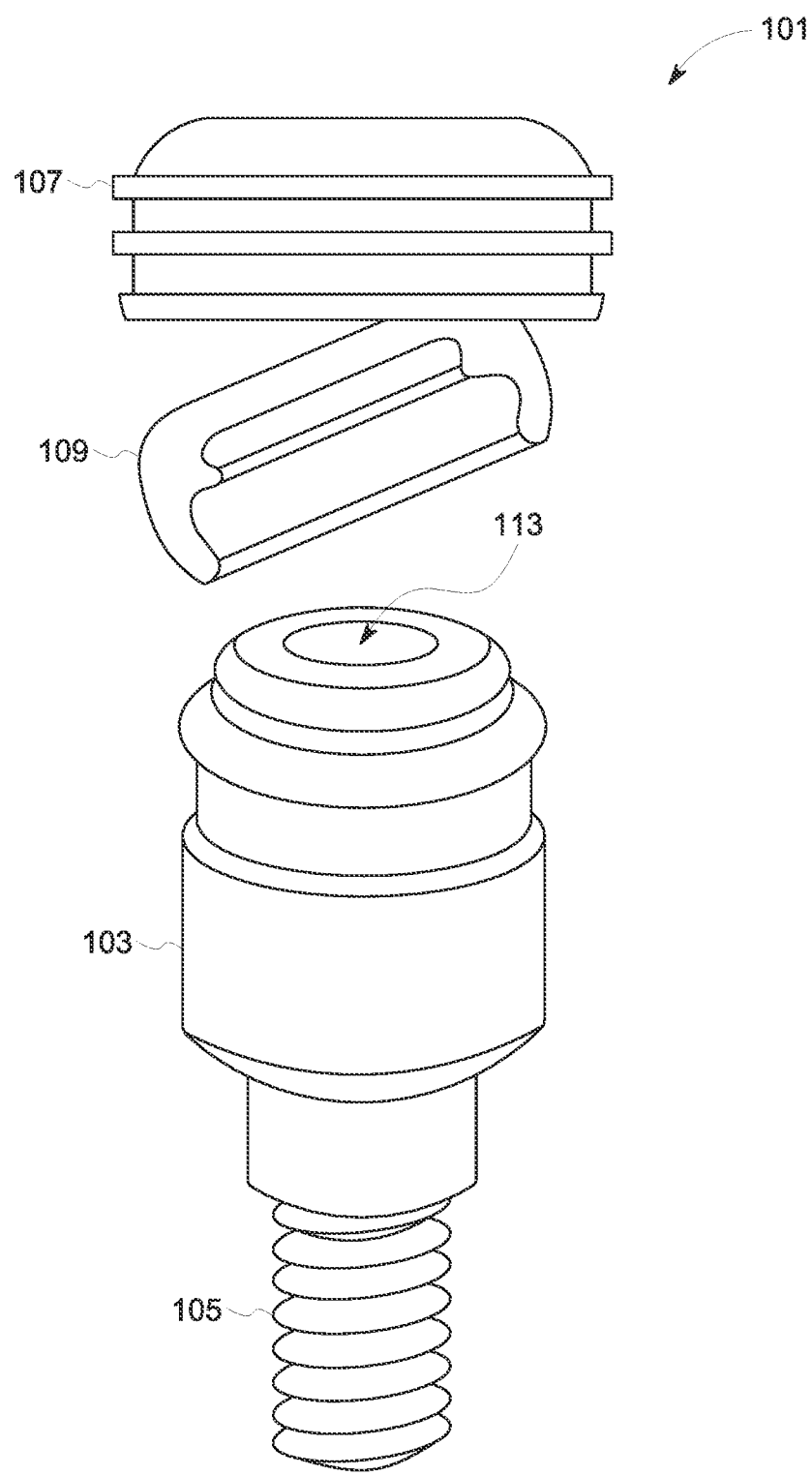
FIG. 1 is a front view of a common locator abutment for use in a dental anchoring system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional dental anchoring systems. Specifically, the present invention provides for an angled abutment, which can improve the securing, anchoring, and user comfort associated with dental prosthesis. In addition, the system provides for an improved straight abutment that allows for improved user comfort and ease of use. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
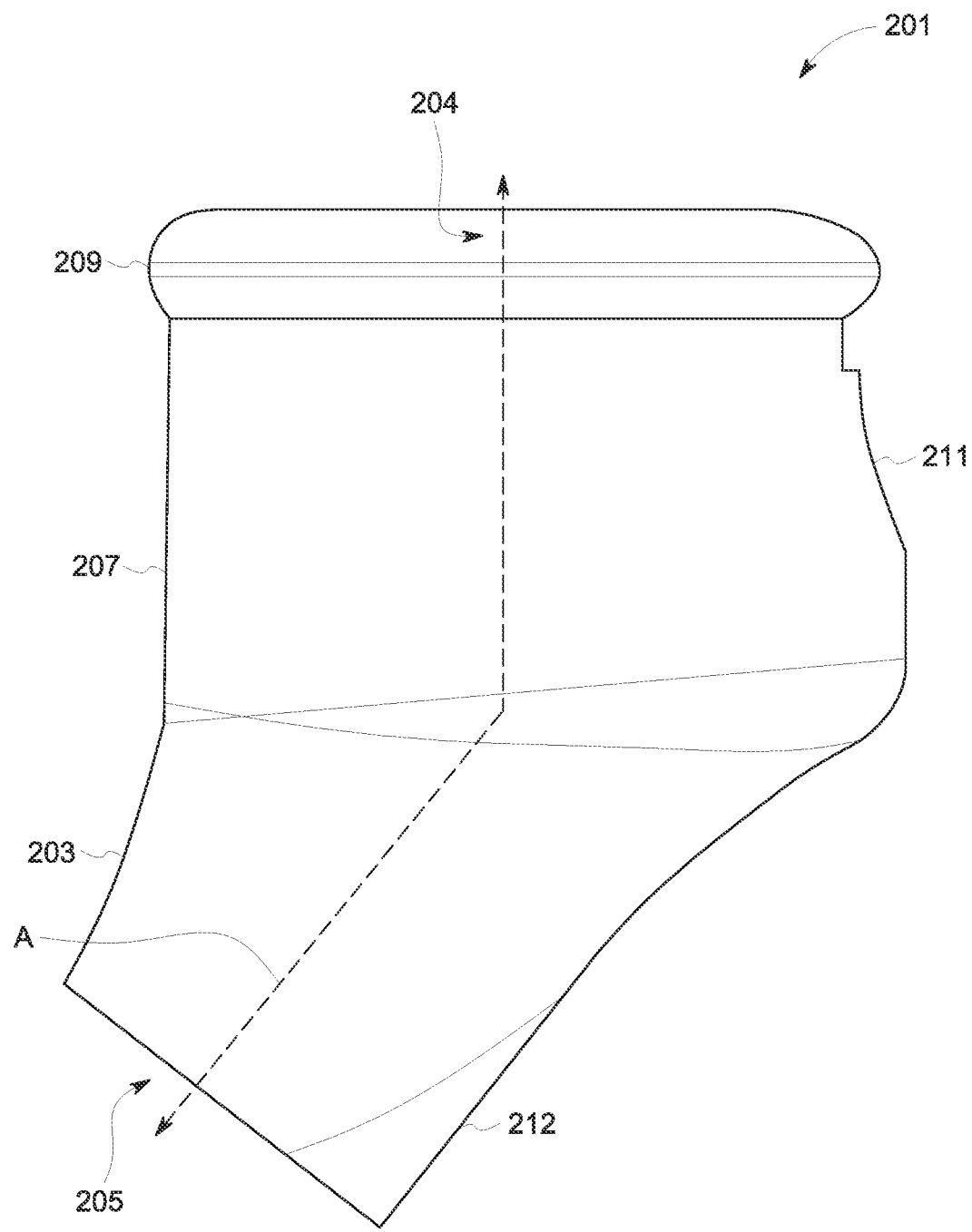
FIG. 2 is a side view of an angled abutment for use in a dental anchoring system of the present invention.
Figure 3:
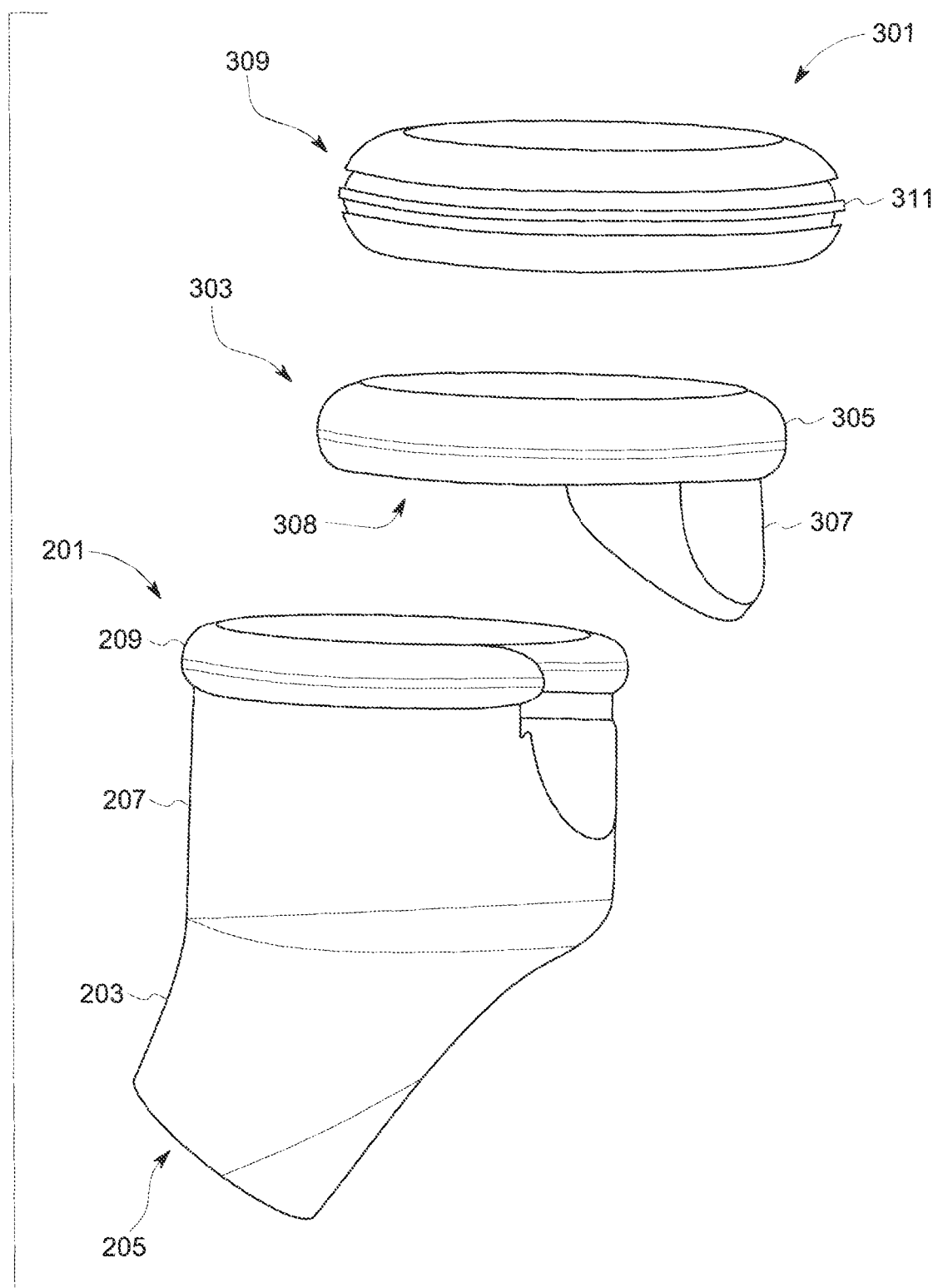
FIG. 3 is an isometric view of a three-piece assembly of the angled abutment of FIG. 2 and other components of the dental anchoring system.

Referring now to the drawings wherein like reference characters identify corresponding or similar elements throughout the several views, FIG. 2 depicts a side view of an angled abutment 201 for use in a dental anchoring system. FIG. 3 depicts an isometric exploded view of an anchoring system 301 in accordance with one embodiment of the present application. It will be appreciated that system 301 overcomes one of more of the above-listed problems commonly associated with conventional abutment systems.

In the contemplated embodiment, system 301 includes angled abutment 201, which comprises a main body 207 extending from a top 204 to a channel body 203 which includes a bottom opening 205 into a channel, the channel being accessible via opening 211. As shown, in this embodiment, a lip 209 extends around a periphery of the top 204. It should be appreciated that the main body 207 is attached to the channel body 203 at a predetermined angle (A) of less than 180 degrees, thereby creating the angle associated with the angled abutment. As further shown, in some embodiments, the bottom section of the channel body includes a tapered rounded design 212, however, it is contemplated that different designs could be used to create abutments for use with various connections for dental implants.

It should be appreciated that one of the unique features believed characteristic of the present application is the angled abutment 201 which provides for use with pre-existing implant systems, wherein the abutment 201 will receive an attachment device, such as a screw, or the like, and provides for an angled fit as needed.

In FIG. 3, an exploded view depicts system 301 as a three-piece assembly. System 301 includes the angled abutment 201 and further includes a retentive insert 303 made of a flexible material and having an insert body 305 and a protrusion 307 extending from a bottom 308 of the insert body, the protrusion configured to engage with the opening 211 to close off the opening. In addition, system 301 includes a metal cap 309 with a body configured to secure over top of the retentive insert. The grooves/slots 311, vertical, horizontal or angular help to secure the metal cap 309 inside a prosthesis by providing an area that can be engaged by a pick up resin. The resin material would flow in these grooves and bond to the inside or prosthesis, thus securing it in the position and not allowing any movement.

It should be appreciated that abutment 201 is configured to secure to a dental implant. As shown, body 305 may have a contoured exterior surface that aids in securing insert 303 inside cap 309. This assembly snaps onto the abutment where lip 209 helps secure the assembly on top of abutment. In practice, the abutment is on a dental implant and the 309-303 assembly is inside a dental prosthesis wherein this assembly helps secure the dental prosthesis onto dental implants inside user's mouth or even outside the mouth in case of maxillofacial prosthesis.

Figure 4:
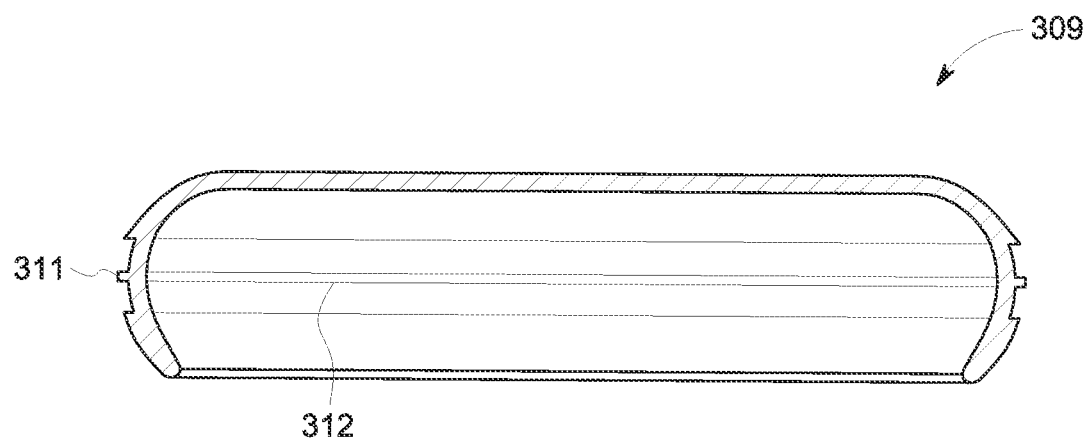
FIG. 4 is a cross sectional view of a metal cap of FIG. 3.
Figure 5:
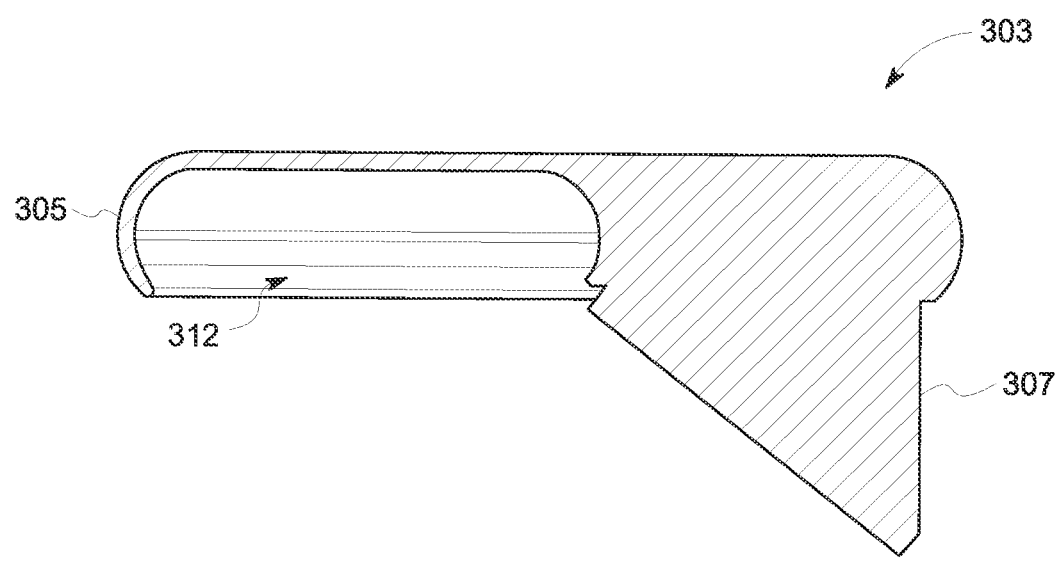
FIG. 5 is a cross sectional view of a retentive insert of FIG. 3.

In FIG. 4, a cross sectional view of metal cap 309 is shown for clarity. Metal cap 309 possibly having interior grooves 312 for additional securement. In FIG. 5, a cross sectional view of retentive insert 303 is shown for clarity.

Figure 6:
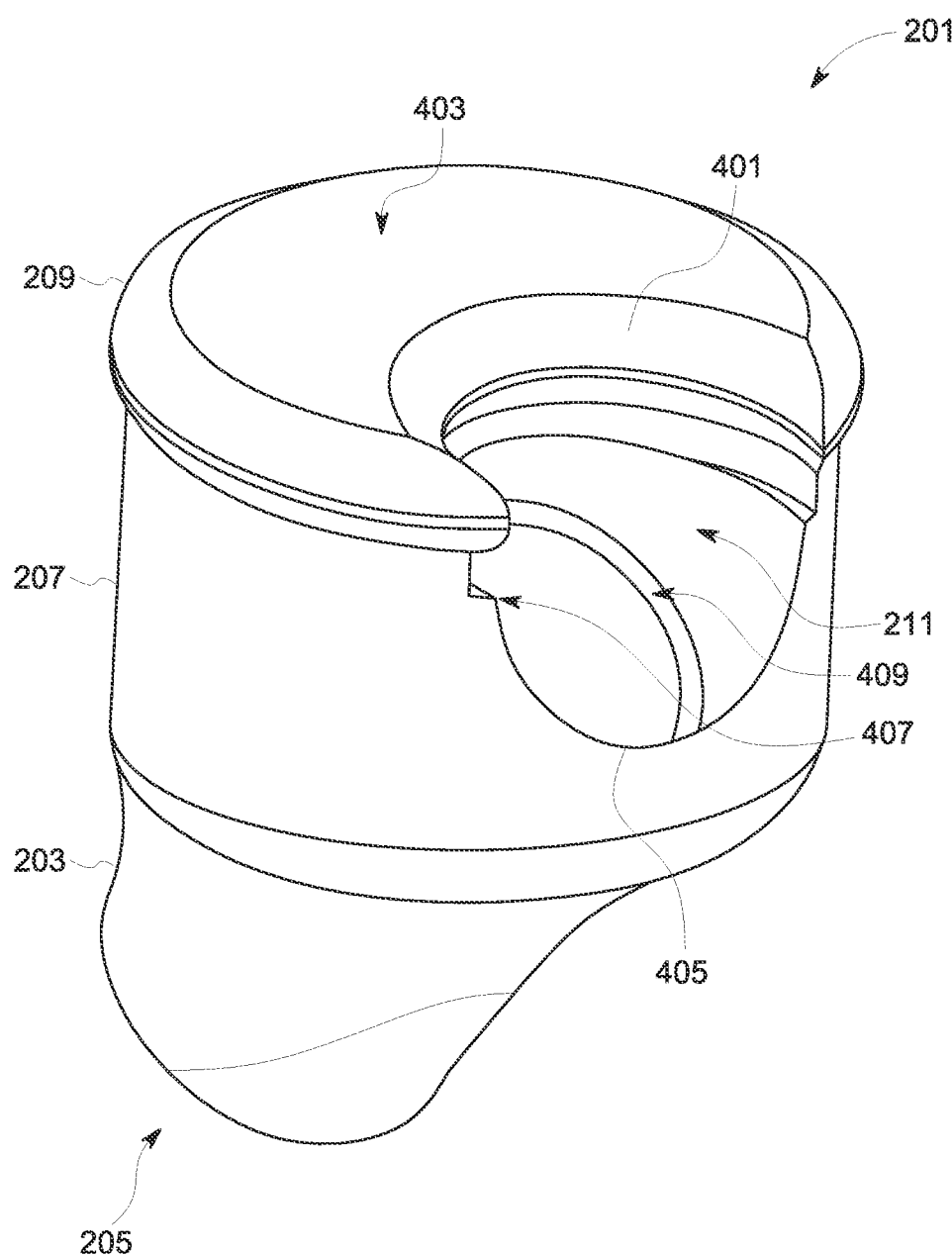
FIG. 6 is a top isometric view of the angled abutment of FIG. 2.

In FIG. 6, another angle of the angled abutment is shown. The angled abutment including a bulge 401 being integral with lip 209 and extending around a partial periphery of the opening 211 as shown. It should be appreciated that the connection between bulge 401 and lip 209 can be sharp or curved. The bulge 401 in the preferred embodiment is rounded, however, it is contemplated that alternative shapes or configurations could be used. In some embodiments, it is contemplated that a top surface 403 of the angled abutment will not be solid, but rather, could have a cut-out area to aid in retention. As further shown, the abutment in this embodiment includes a sharp edge 405 that extends around a bottom periphery of the opening 211. It should again be appreciated that the sharp edge could be an alternative design such as a rounded edge or the like. Abutment 201 further includes a sharp edge 407 on both sides of edge 405, however, this edge 407 can further be rounded or non-existent. Further shown is a shelf 409 for the screw head, or other device, to rest upon securement.

Figure 7:
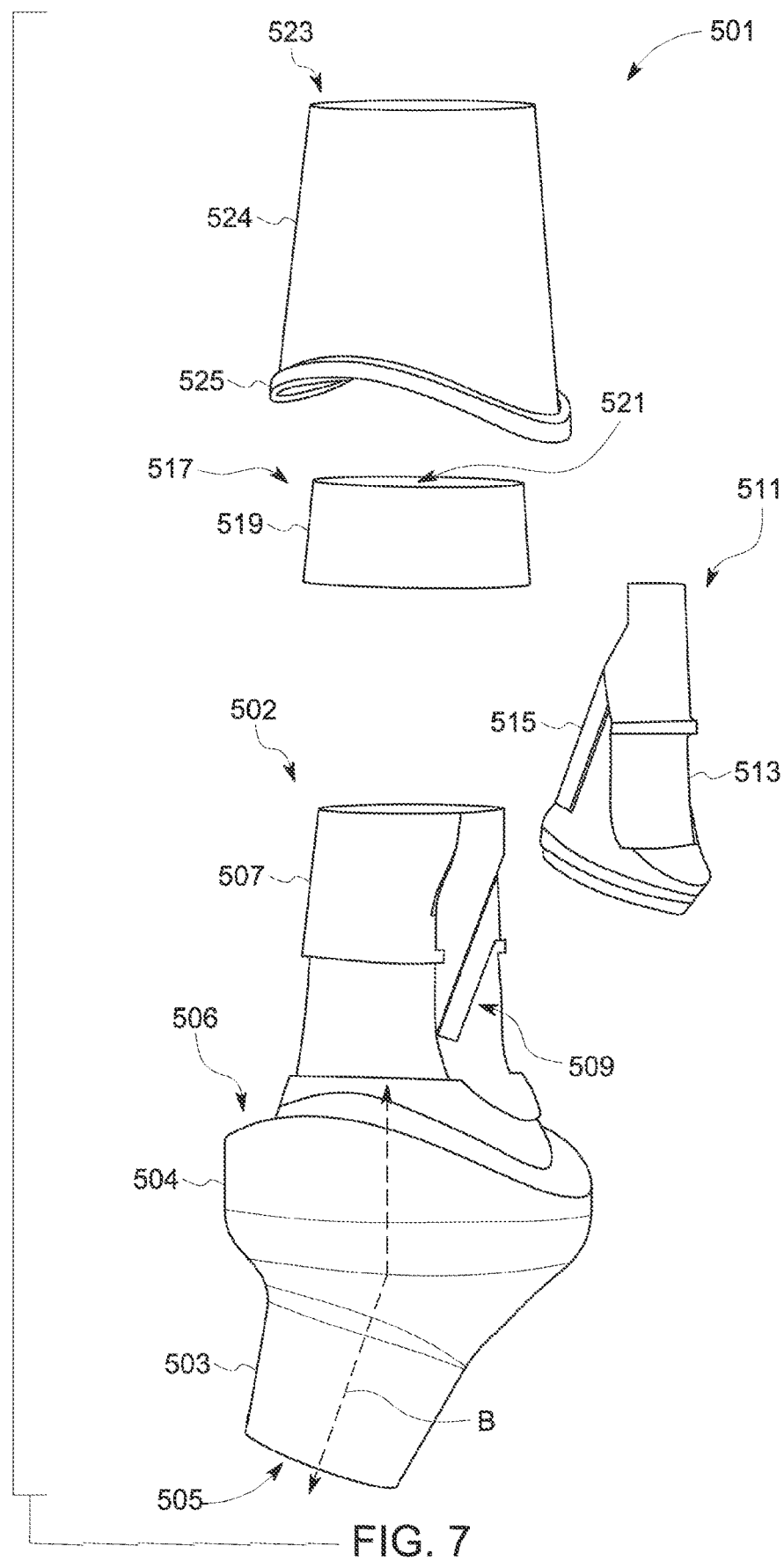
FIG. 7 is a side view of a four-piece assembly of an angled abutment and other components of an alternative embodiment of the present application.

In FIG. 7, an exploded view of a four-piece anchoring system 501 is shown in accordance with an alternative embodiment of the present invention. System 501 including an angled abutment 502 having a main body 504 extending from a top 506 to a channel body 503 with an opening 505, the channel body extending away from the main body at a predetermined angle (B) of less than 180 degrees. Abutment 502 further includes an extended top body 507 integral with the main body and extending away from the top. An opening 509 extending inwardly from the extended top body and into the channel body, the opening configured to receive an attachment device.

System 501 further including a secondary attachment 511 having a body 513 that tapers from top to bottom and having one or more grooves 515 configured to engage within opening 509. It should be appreciated that the grooves can vary in size and location. In addition, it is contemplated that an embodiment could include no grooves or slots, and instead have a flat surface. Yet further, system 501 can include a retentive insert 517 made in a flexible material, with a body 519 having an opening 521 extending from an insert top to an insert bottom. The retentive insert may have a vertical cut through the body 519, since the material would be flexible, the cut would allow the edges to flex on top of each other when squeezed using a special tool, reducing the diameter of retentive insert and thus allowing easy insertion into the metal cap. This cut would also help in retrieving the retentive insert from inside of the metal cap. In addition, system 501 can include a metal cap 523 having a body 524 configured to secure over the top of the insert, secondary attachment, and extended top body, the metal cap having a bottom lip 525 configured to aid in seating the cap in place. In the preferred embodiment, the retentive insert is configured to fit within the metal cap, this assembly then fitting on top of the abutment and secondary attachment assembly. The presence of insert 517 inside of metal cap 523 allows for the metal cap to be secured tightly and firmly in place.

It should be appreciated that the abutment of FIG. 5 is intended to function as a non-retrievable option for placing implant crowns in a user's mouth, however, this system can be modified to make the crown retrievable. One such modification could be presence of thin lip of material like a screw thread, the retentive insert would now be screwed in place inside the metal cap. The thin lip of material can be designed to break when a shear or torqueing force is applied by engaging a dental instrument in the margin between 525 & 506. Another modification of this abutment system could include a rubber or silicone washer in the area of margin between metal coping and abutment. The purpose of this washer would be to seal off the abutment assembly from any bacteria or saliva once seated in patient's mouth. Further, this system could further allow to overcome the problems faced with cement retained implant restorations or prosthesis such as bone loss due to excess cement.

Figure 8:
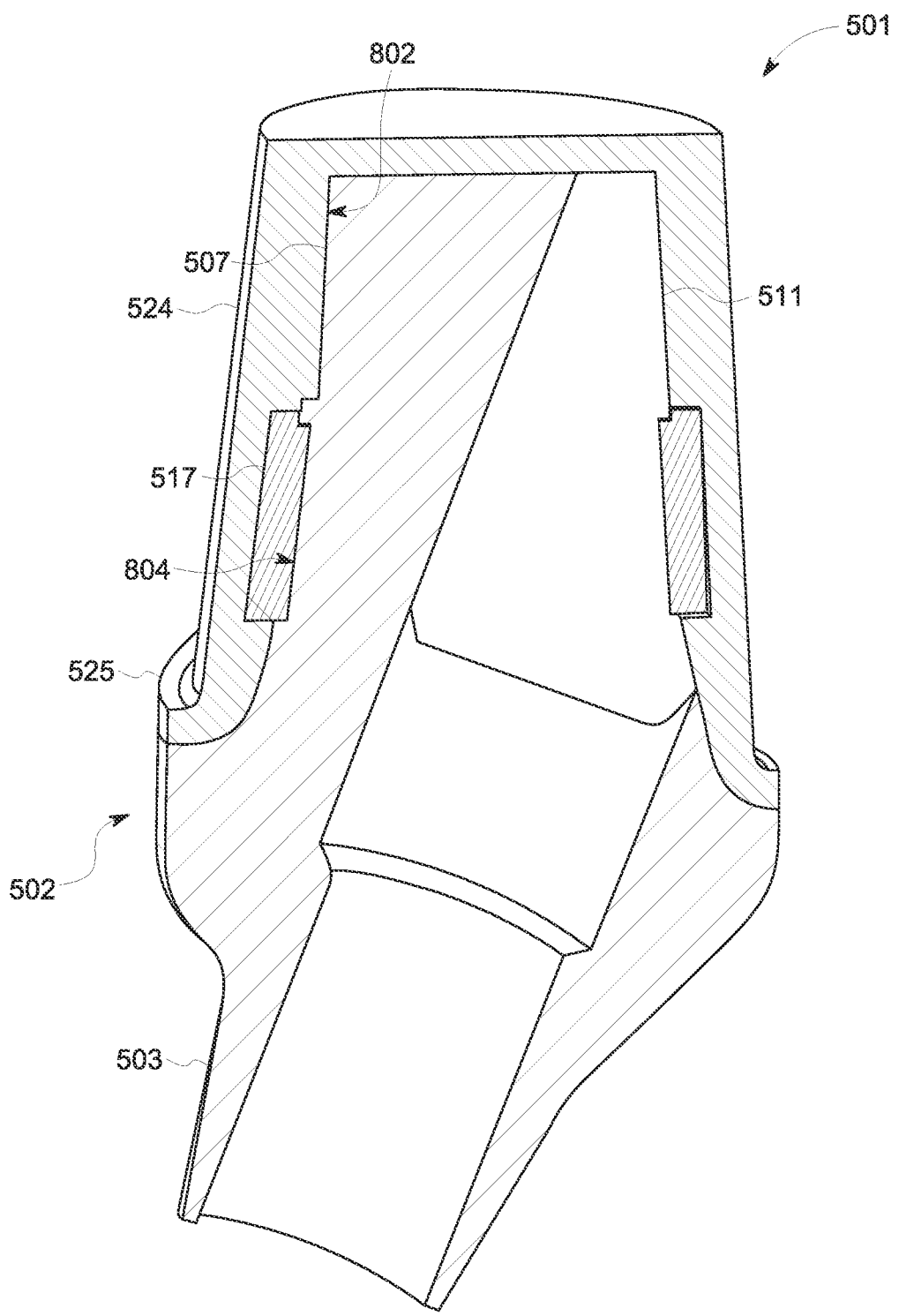
FIG. 8 is a cross sectional view of the assembly of FIG. 7.
Figure 9:
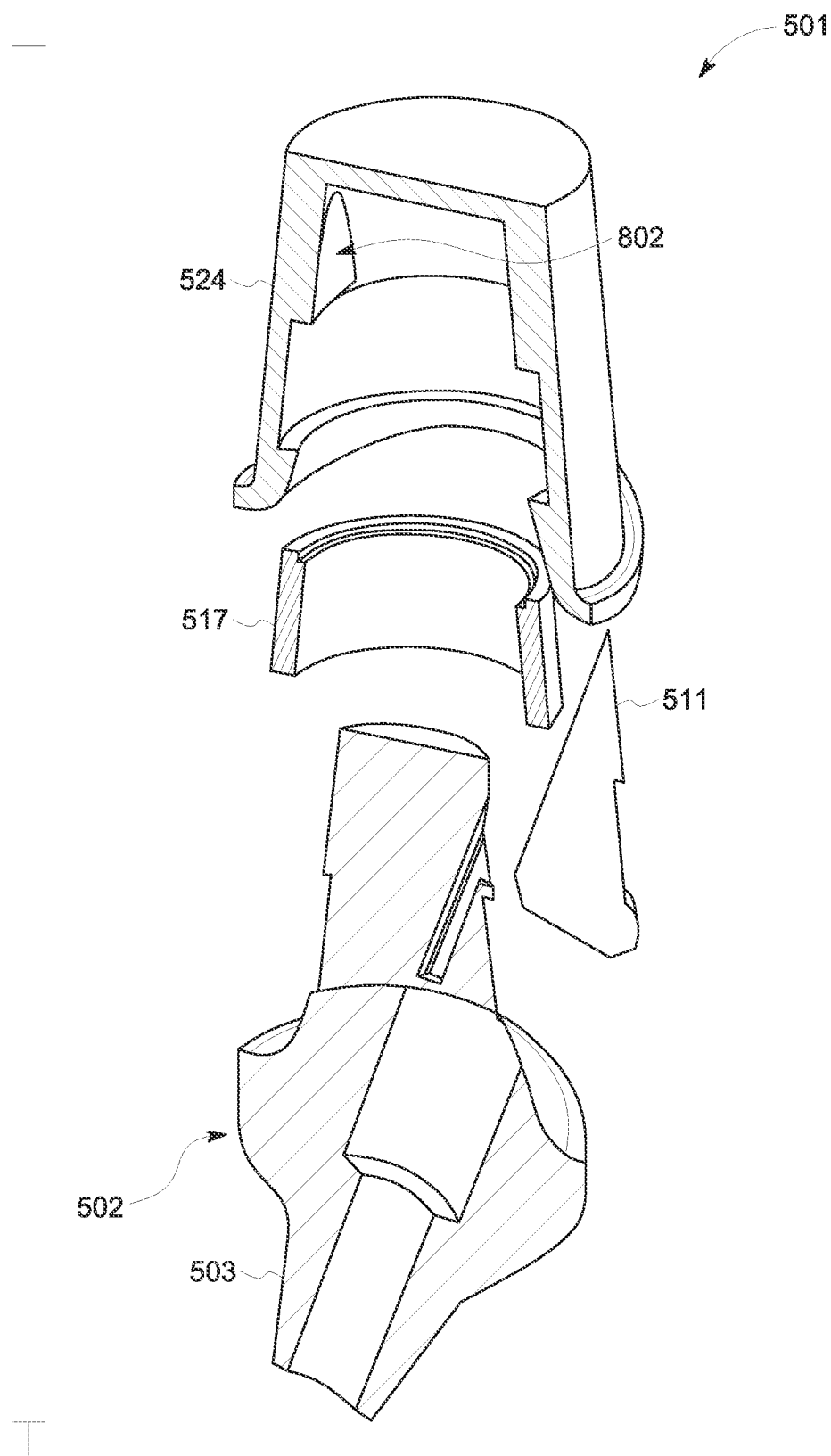
FIG. 9 is an exploded cross-sectional view of the assembly of FIG. 7.

In FIGS. 8 and 9, cross sectional views of anchoring system 501 are shown for clarity. FIG. 8 depicts how the angled abutment, retentive insert, metal housing, and secondary attachment fit together. As shown, the angled abutment 502 includes a channel 804 wherein the retentive insert 517 is secured. Further shown is a flat surface 802 which provides an anti-rotation feature of the embodiment.

Figure 10:
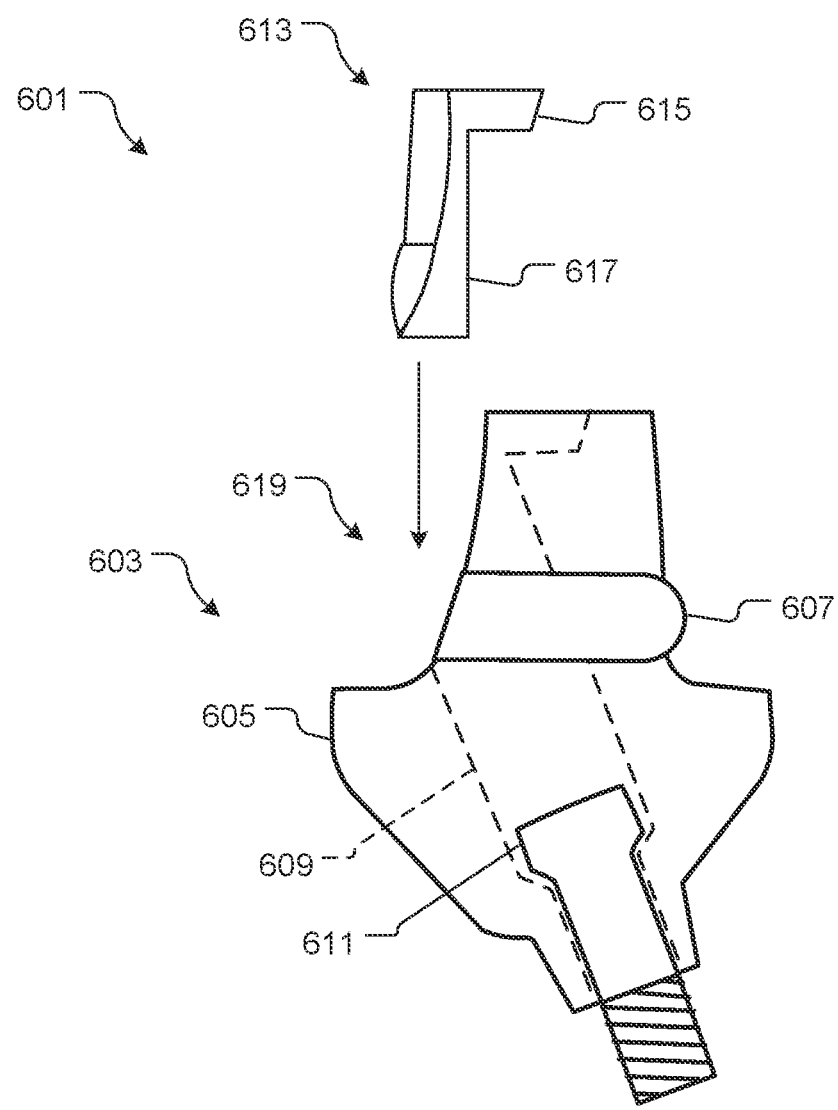
FIG. 10 is a side view of an alternative embodiment of a dental anchoring system in accordance with the present invention.

In FIG. 10, a side view depicts an alternative embodiment of a dental anchoring system 601 in accordance with the present invention. Anchoring system 601 including an angled abutment 603 having a body 605 with a bulge 607 extending around an exterior of the body. As shown, a channel 609 extends through the body and is configured for receiving the attachment device 611, such as a screw, therethrough. Further shown is a secondary attachment 613 having a lip 615 and a body 617 configured to engage with and cover the access hole 619 of the abutment.

In FIGS. 11-16, various embodiments of a dental anchoring system that utilizes abutment 703 are shown, the dental anchoring system of these embodiments providing good resistance, support, and retention to a dental prosthesis such that it can be retrievable. Improved resistance form would lead to less wear of retentive insert, thus less frequent replacements. Yet further, these embodiments provide an alternative to fixed complete dentures or fixed full arch prosthesis on dental implants. Yet further, these embodiments allow for removable dentures without any flanges. Yet further, the embodiments of FIGS. 11-16 provide for a removable option to allow for better oral hygiene. This abutment can further offer simpler and cost-effective solutions for dentists and patients at recall appointments, as the prosthesis should be retrieved easily and replacing retentive inserts could be cheaper than replacing implant abutment screws.

Figure 11:
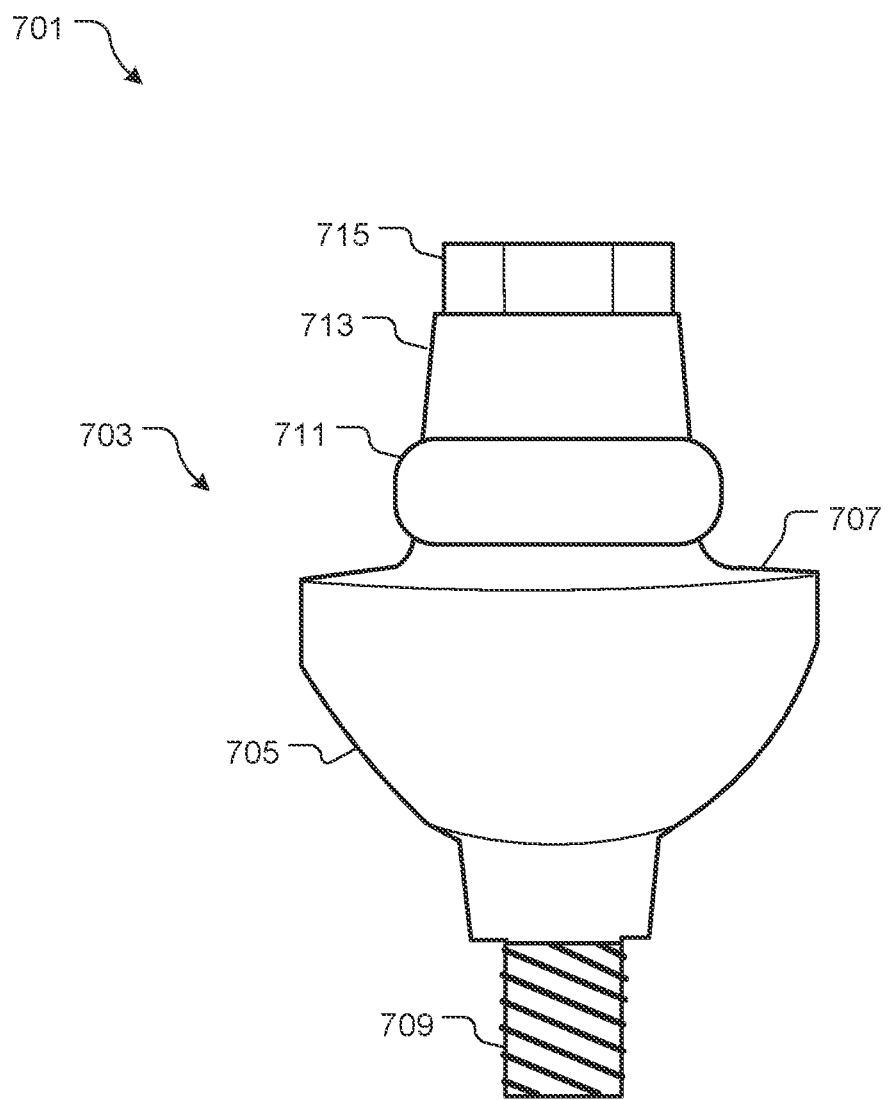
FIG. 11 is a side view of an alternative embodiment of dental anchoring system in accordance with the present application.

In FIG. 11, an embodiment of the anchoring system 701 is shown. The embodiment, having an abutment 703 with an abutment body 705, the abutment body 705 having deep chamfer or shoulder finish line 707. As shown, this embodiment further includes the attachment device 709, such as a screw, and further includes a retentive bulge 711 extending around the periphery of the body. In this embodiment, an axial wall 713 extends above the bulge 711, wherein the axial wall can be calibrated for different combinations of height and taper. This allows for the abutment to be customizable for varying applications and patient situations. Further, the geometry of the top surface of abutment would depend on whether it is engaging or non engaging, used for crown and bridge or partial and complete dentures. The top surface may have a screw access hole, a flat top with an internal or external hex 715 (or another engaging design to allow better engaging with the abutment tightening tool) on the sides to allow for tightening of the abutment for the implant, an internal hex or another engaging design, or retentive feature on the top to allow retentive insert to lock in.

The metal housing may not be covering the whole abutment and would have retentive features on the outside to allow for resin or any other pick up material to lock in and allow for good retention of housing in the dental prosthesis. The retentive features could be made of grooves or beads or mesh or any other design or a combination of these that would allow the pick up material to lock in and have minimum thickness for strength. This housing would be picked up in a complete or partial denture. This housing would be seated on the finish line to provide a metal to metal connection and thus provide good support. The part of abutment above the housing would be surrounded by resin of the denture and also provide support and resistance to the prosthesis.

Figure 12:
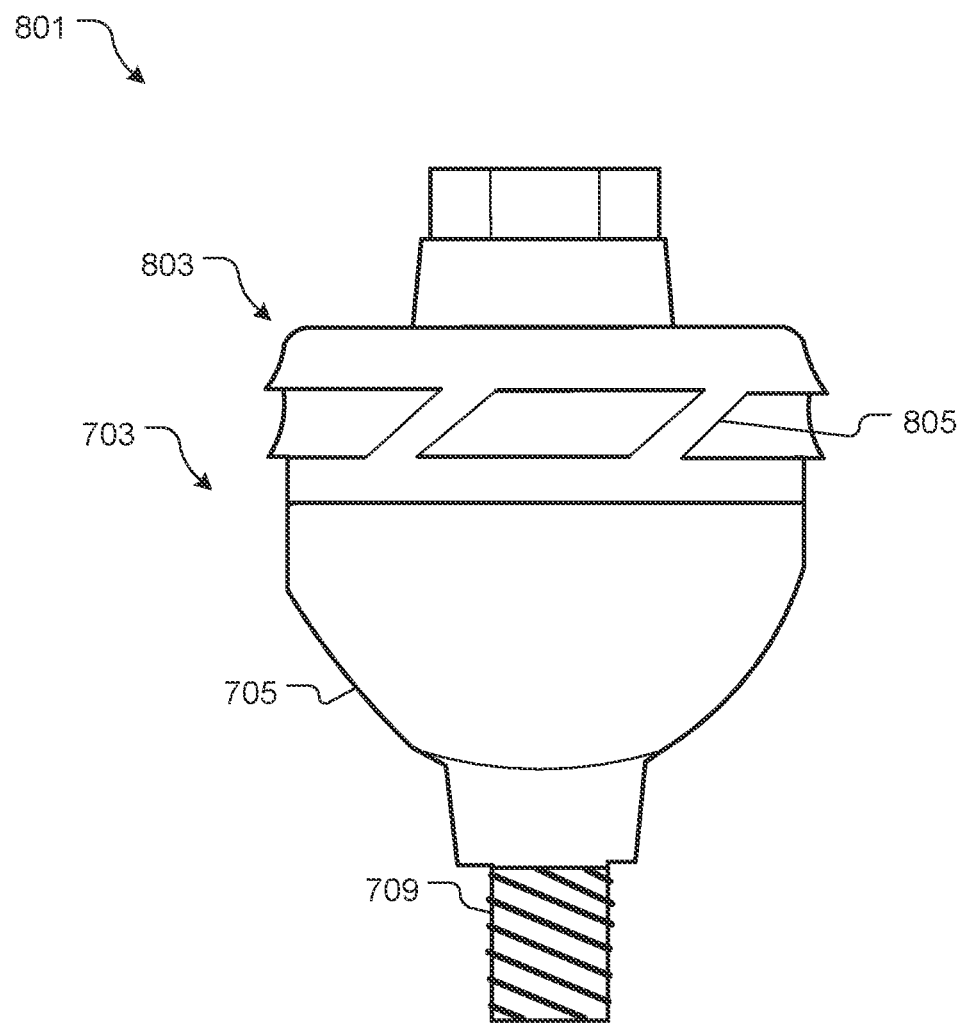
FIG. 12 is a side view of an alternative embodiment of dental anchoring system in accordance with the present application.
Figure 13:
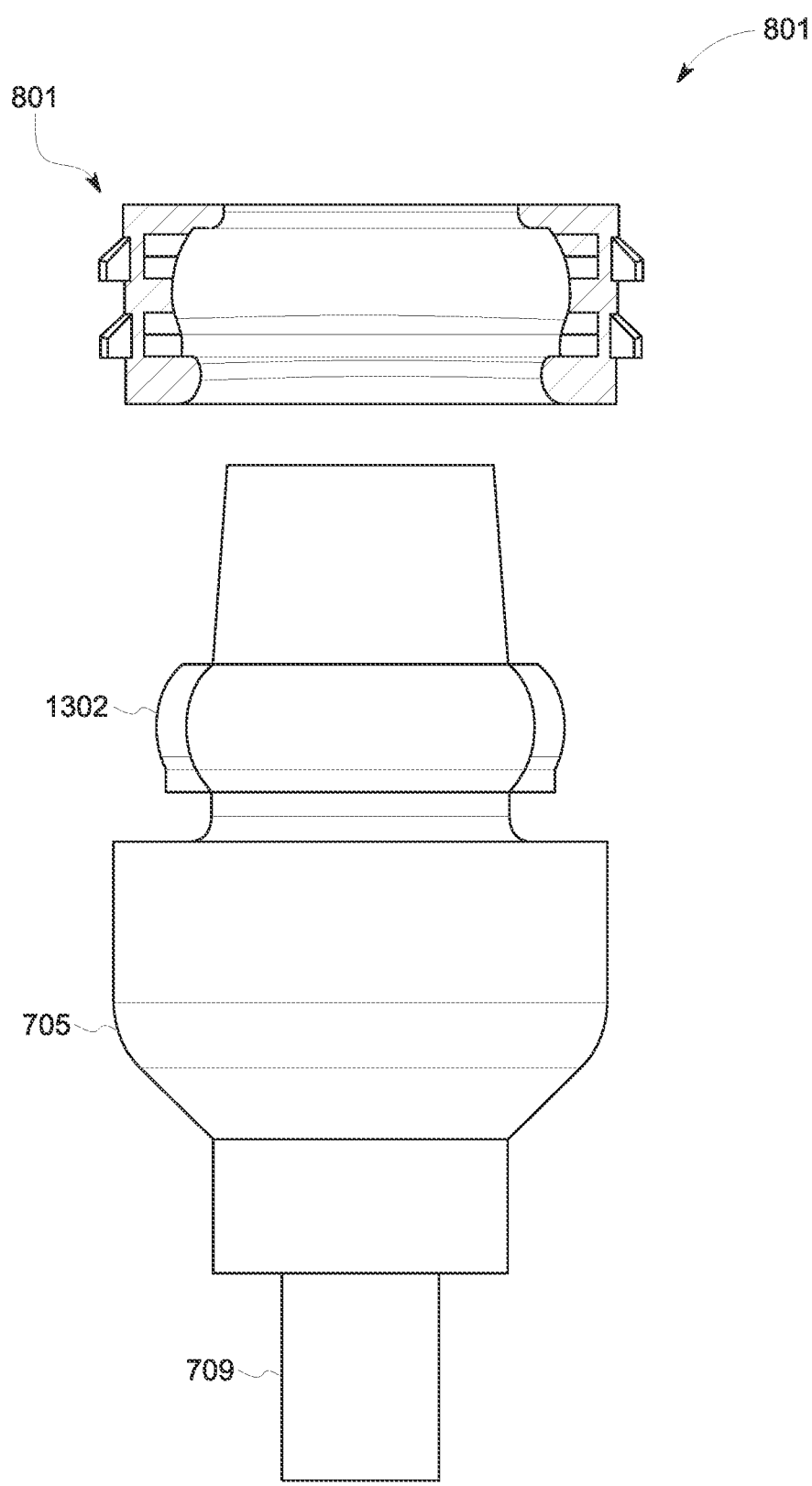
FIG. 13 is a side view of the embodiment of FIG. 12 with a cross sectional view of the metal cap shown.

In FIGS. 12 and 13, an embodiment 801 is shown, having an abutment 703 as discussed above and further having a metal cap 803. The metal cap 803 in this embodiment having one or more grooves 805, and the metal cap in this embodiment fitting completely over the top of the abutment. In FIG. 13, the cross sectional view depicts the retentive insert 1302, which engages within the metal cap 803.

Figure 14:
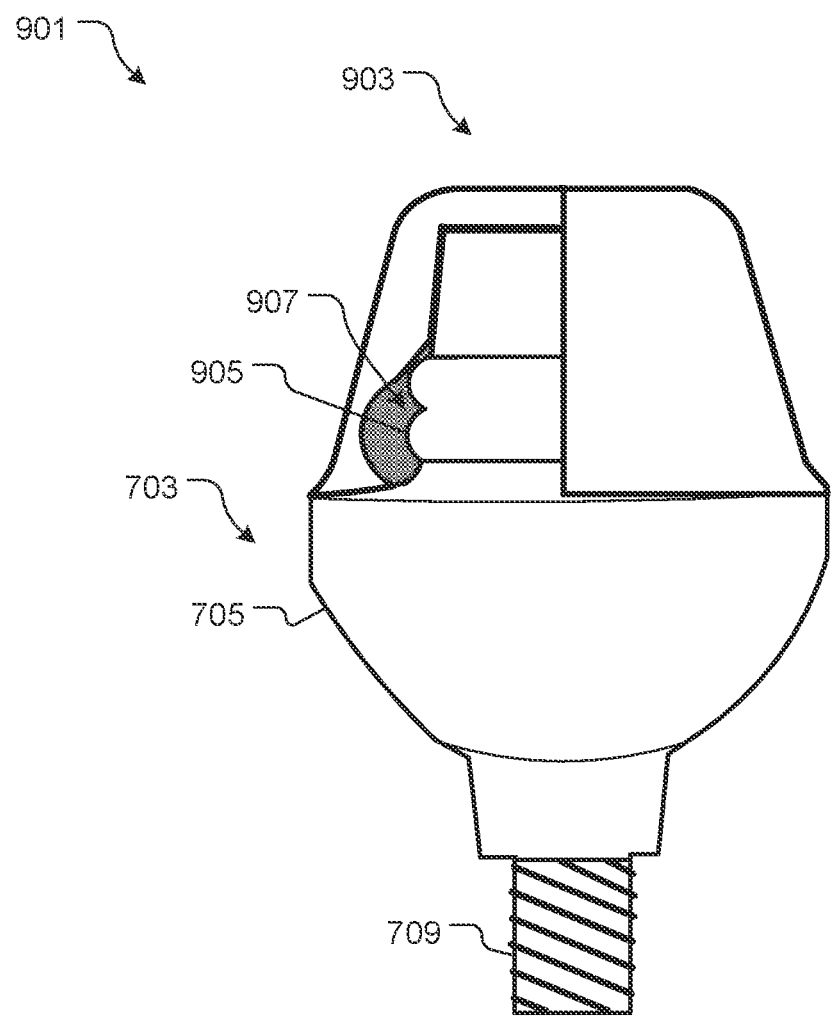
FIG. 14 is a side view of an alternative embodiment of dental anchoring system in accordance with the present application.
Figure 15:
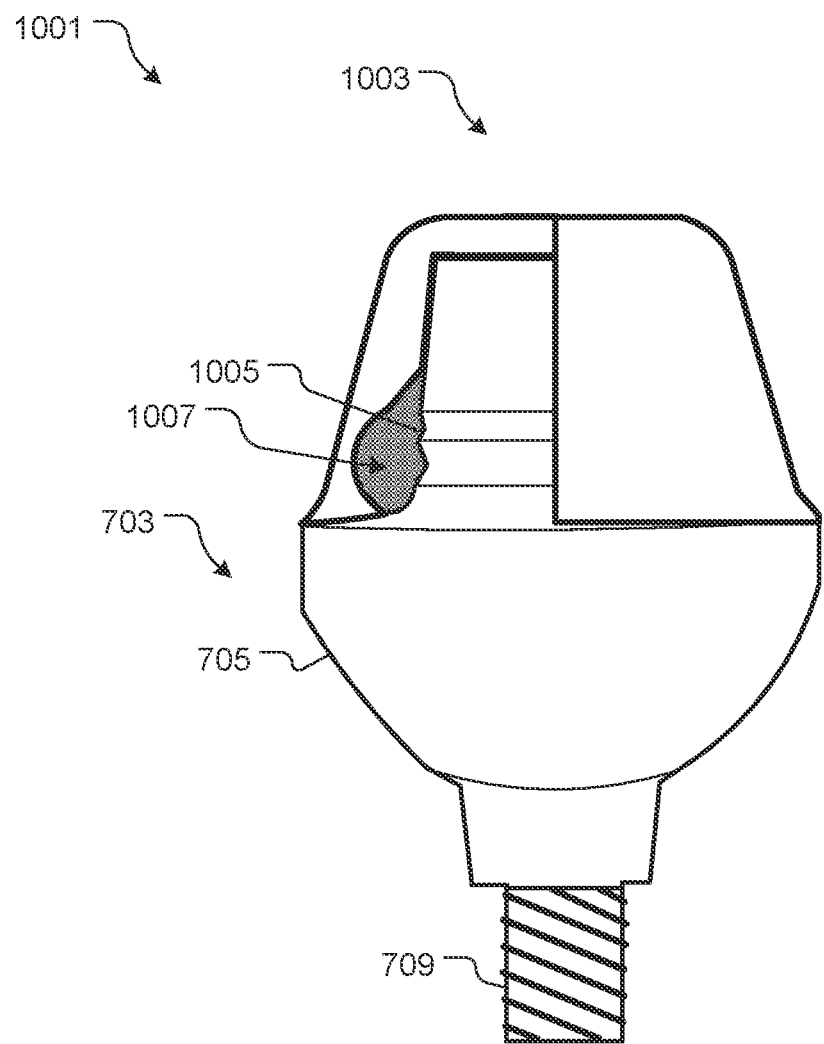
FIG. 15 is a side view of an alternative embodiment of dental anchoring system in accordance with the present application.
Figure 16:
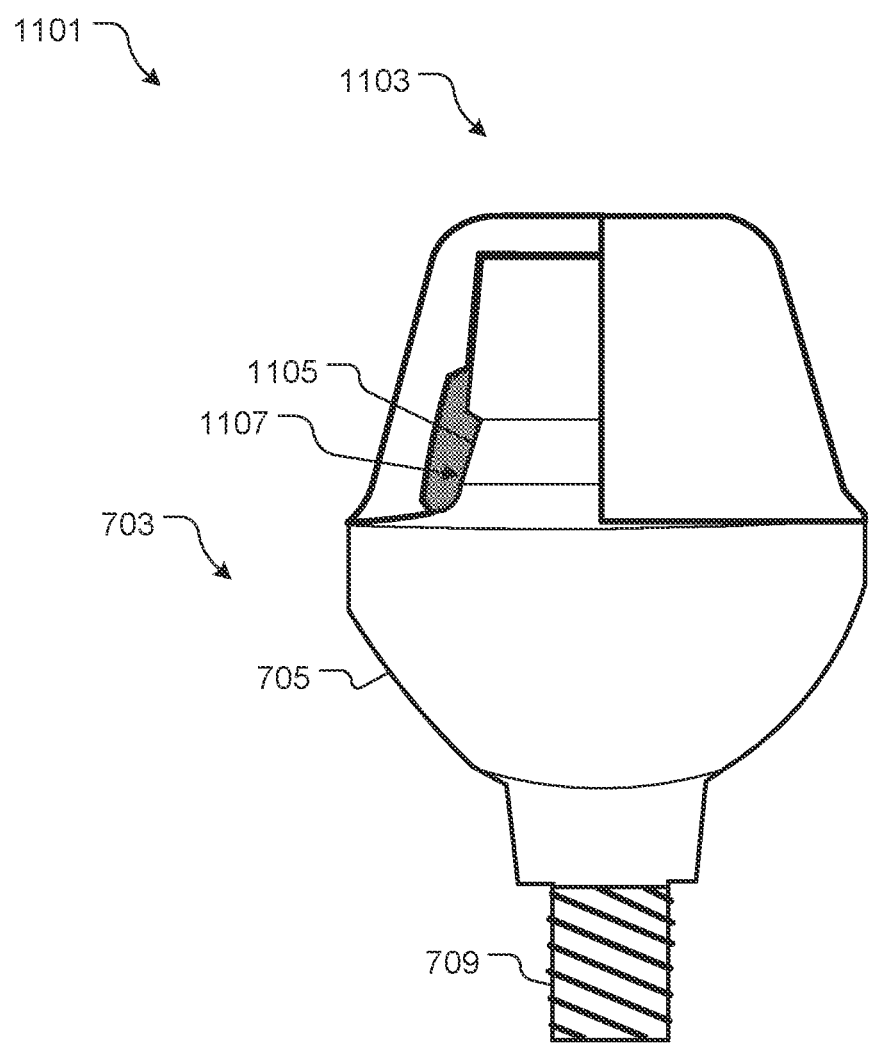
FIG. 16 is a side view of an alternative embodiment of dental anchoring system in accordance with the present application.

In FIGS. 14 through 16, embodiments 901, 1001, 1101 are shown, having a metal cap 903, 1003, 1103 shown partially open for clarity. As shown, the metal cap 903, 1003, 1103 can secure over the bulge 905 and shelves 1005, 1105. As shown with these embodiments, the bulges can vary in shape, such as being two bulges 905 and/or inverted rings 1005 and/or slot undercut 1105.

In these embodiments, a retentive insert 907, 1007, 1107 is positioned between the bulge and the metal cap and made of a flexible material. The retentive insert would be interchangeable by use of a special tool designed for this abutment. The retentive inserts would be available for different amounts of retention. The inserts would be color coded and/or marked with lines ranging from just single line to several indicating the amount of retention.

It should be appreciated that the elements of the various embodiments described above can be interchanged with one another. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A dental anchoring system, comprising:
   an angled abutment, having:
      a main body extending from a top to a channel body, the channel body extending away from the main body at a predetermined angle less than 180 degrees;
      a lip extending around the top; and
      an opening extending from the top and through the channel body, the opening configured to receive an attachment device;
   an insert body, having:
      a top surface, a bottom surface, and a side surface;
      a protrusion extending from the bottom surface, the protrusion is configured to fit within and cover the opening, and
   a metal cap configured to engage with the insert body, the metal cap is configured to cover the top surface and the bottom surface of the insert body, the metal cap having an outer surface with a plurality of grooves that extend partially inwardly from the outer surface;
   wherein the angled abutment is configured to provide an angled attachment for a dental prosthesis.

2. The system of claim 1, wherein the angled abutment further comprises:
   a sharp edge extending around a portion of a periphery of the opening.

3. The system of claim 1, wherein the angled abutment further comprises:
   a bulge integral with the lip and extending around a portion of a periphery of the opening.

4. The system of claim 3, wherein the bulge is round.

* * * * *